US007813221B2

(12) United States Patent
Barakat et al.

(10) Patent No.: US 7,813,221 B2
(45) Date of Patent: Oct. 12, 2010

(54) SENSOR AND RECORDER COMMUNICATION

(75) Inventors: Simon Barakat, Chilly-Mazarin (FR); Harvey Ray Grimes, Slependen (NO)

(73) Assignee: WesternGeco L.L.C., Houston, TX (US)

( * ) Notice: Subject to any disclaimer, the term of this patent is extended or adjusted under 35 U.S.C. 154(b) by 660 days.

(21) Appl. No.: 11/535,835

(22) Filed: Sep. 27, 2006

(65) Prior Publication Data

US 2007/0036031 A1 Feb. 15, 2007

Related U.S. Application Data

(63) Continuation-in-part of application No. 10/532,644, filed as application No. PCT/EP03/50872 on Nov. 21, 2003, now Pat. No. 7,573,782.

(30) Foreign Application Priority Data

Nov. 22, 2002 (GB) ................... 0227293.8

(51) Int. Cl.
*G01V 1/00* (2006.01)
(52) U.S. Cl. ....................................... 367/76
(58) Field of Classification Search .................. 367/56, 367/76–80; 455/440, 443, 444, 449
See application file for complete search history.

(56) References Cited

U.S. PATENT DOCUMENTS

| 5,659,596 | A | * | 8/1997 | Dunn ...................... 455/456.1 |
| 6,070,129 | A | * | 5/2000 | Grouffal et al. ............... 702/32 |
| 6,219,620 | B1 | | 4/2001 | Park et al. |
| 6,226,601 | B1 | | 5/2001 | Longaker |
| 6,370,378 | B1 | * | 4/2002 | Yahagi ........................ 455/433 |
| 6,421,731 | B1 | * | 7/2002 | Ciotti et al. .................. 709/238 |
| 6,424,931 | B1 | | 7/2002 | Sigmar et al. |
| 6,553,316 | B2 | * | 4/2003 | Bary et al. ..................... 702/16 |
| 6,947,446 | B2 | * | 9/2005 | LoGalbo et al. ............. 370/468 |
| 2003/0040310 | A1 | | 2/2003 | Barakat et al. |
| 2005/0114033 | A1 | * | 5/2005 | Ray et al. ..................... 702/14 |

FOREIGN PATENT DOCUMENTS

| EP | 0978733 A2 | 2/2000 |
| WO | 2002033558 A1 | 4/2002 |
| WO | WO 2004048144 A3 | 6/2004 |

OTHER PUBLICATIONS

Schurgers, et al. "Distributed Assignment of Encoded MAC Addresses in Sensor Networks." MobiHoc'01, Oct. 4-5, 2001, Long Beach, CA.*
International-Search-Report-and-Written-Opinion, dated Jun. 2, 2008 for International Application No. PCT/US2007/078687.
Patent Abstracts of Japan translation of first page of JP 10-031075 (application published Feb. 3, 1998 and cited by Applicants previously).

* cited by examiner

*Primary Examiner*—Jack Keith
*Assistant Examiner*—Krystine Breier

(57) ABSTRACT

Implementations of various technologies for a method for establishing communication pathway redundancy within a seismic recording array. In one implementation, the method may include identifying each data acquisition cell deployed in a seismic field and determining one or more communication pathways for each data acquisition cell. The communication pathways include a primary communication pathway and at least one backup communication pathway toward a data collection unit. The method may further include transmitting the communication pathways to each data acquisition cell deployed in the seismic field

16 Claims, 14 Drawing Sheets

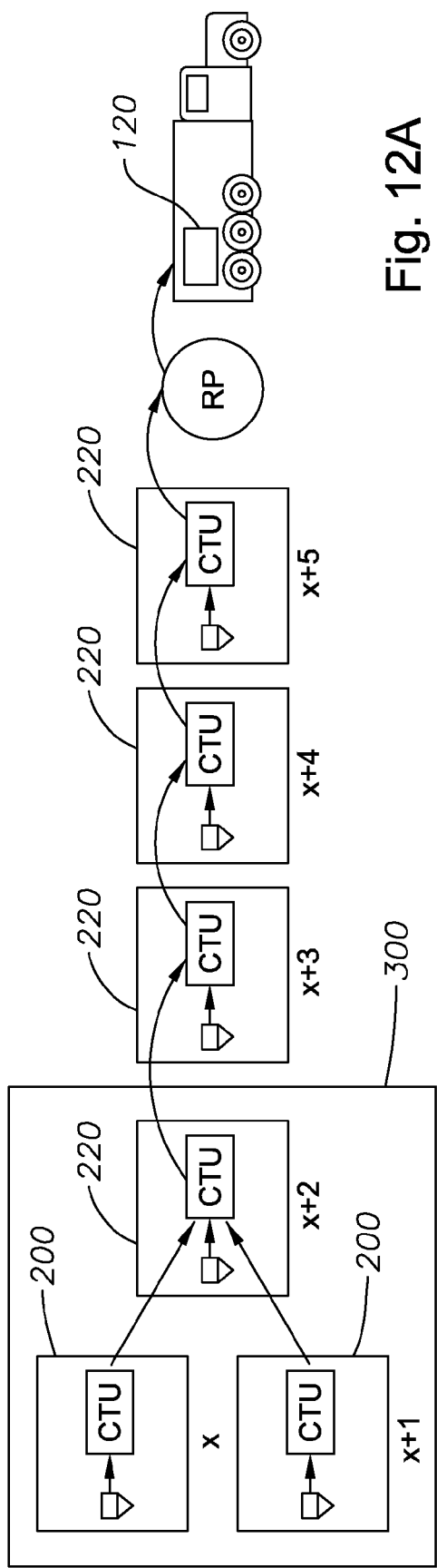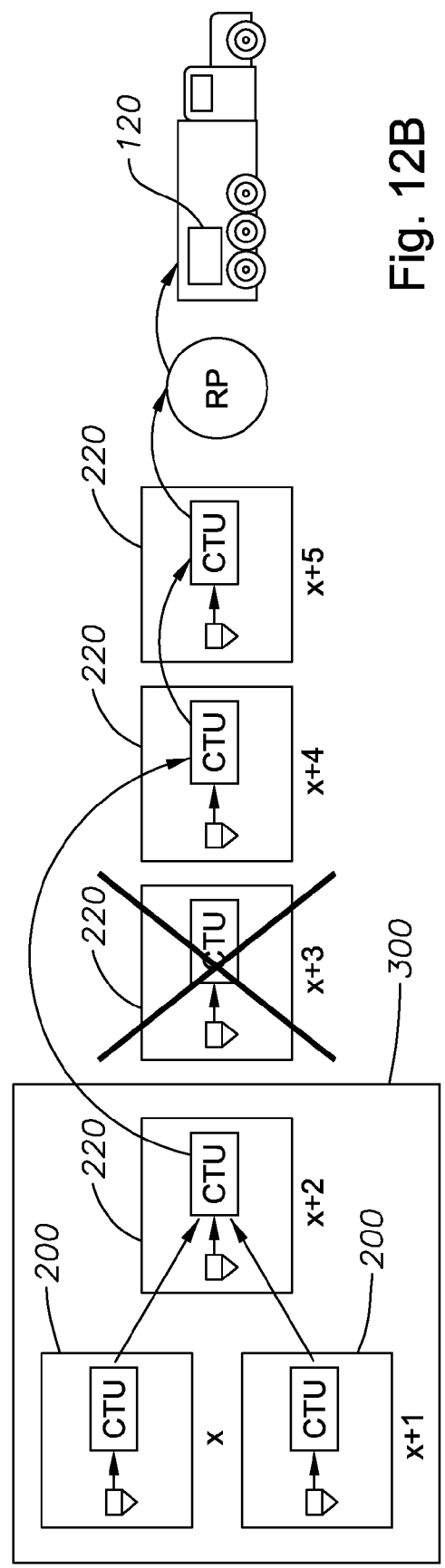

SENSOR AND RECORDER COMMUNICATION

CROSS-REFERENCE TO RELATED APPLICATIONS

This application is a continuation-in-part of co-pending U.S. patent application Ser. No. 10/532,644, filed Aug. 10, 2006, which claims benefit of PCT/EP03/58072, filed Nov. 21, 2003, which claims benefit of GB 0227293.8, filed Nov. 22, 2002. Each of the aforementioned related patent applications is herein incorporated by reference.

BACKGROUND

1. Field of the Invention

Implementations of various technologies described herein generally relate to seismic data acquisition.

2. Description of the Related Art

The following descriptions and examples are not admitted to be prior art by virtue of their inclusion within this section.

In a typical seismic survey, a plurality of seismic sources may be activated to generate energy which may be reflected back by the earth's sub-surface layers. The resultant seismic wavefield may be sampled by an array of seismic sensors deployed at a distance from the seismic source. Each sensor may be configured to acquire seismic data, normally in the form of a record or trace representing the value of some characteristic of the seismic wavefield against time. Typically, a plurality of sensors is arranged in a grid, such that the recorded data from the wavefields may substantially cover the entire area of exploration with sufficient resolution to detect the variation of the sub-surface structure over small spatial distances. The acquired seismic data may be transmitted over electrical or optical cables to a recorder system. The recorder system may then store, analyze, and/or transmit the data.

Large seismic sensor arrays are becoming typical. The larger the array, the greater the deployment time and cost of equipment may be for the survey. Wireless seismic sensor arrays have been attempted to help minimize deployment time and cost of equipment.

Typical wireless approaches use a variety of communication protocols, such as:

GSM-DCS, or Global System for Mobile Communications-Digital Cellular System, which employs a form of time-division multiplexing called Time Division Multiple Access (TDMA);

UMTS, or Universal Mobile Telecommunications System, which may be used to deliver broadband information at speeds up to 2 Mbps to wireless devices anywhere in the world through fixed, wireless and satellite systems;

DECT, or Digitally Encoded Cordless Telecommunications, which is a common standard for cordless personal telephones;

CDMA, or Code-Division Multiple Access, which is a digital cellular technology that uses spread-spectrum techniques; and GPRS, or General Packet Radio Service, which is a standard for wireless communications and runs at speeds up to 115 Kbps and supports a wide range of bandwidths.

However, the application of each of these protocols brings its own problems. For example, UMTS, DECT and CDMA are telephone oriented, rather than network oriented, which imposes undesirable restrictions on communication of seismic data. UMTS and GSM have the same upstream and downstream bandwidth, but in seismic acquisition a much higher upstream bandwidth is needed than downstream bandwidth. GPRS allocates more than one channel downstream and sometimes none upstream, which is counter to the needs in a seismic acquisition system. GSM-DCS typically makes poor use of the number of channels in a cell versus the possible range of the cell because of a disparity between the density of the sensors in the cell and the surface area of the cell. Additionally, GSM-DSC employs a wire between its base transceiver unit and the Basic Station Controller as well as between the Basic Station Controller and the central recording and processing system. As such, although costs savings can be realized with wireless systems, typical wireless techniques applied in seismic acquisition need improvement.

SUMMARY

Described herein are implementations of various technologies for a method for establishing communication pathway redundancy within a seismic recording array. In one implementation, the method may include identifying each data acquisition cell deployed in a seismic field and determining one or more communication pathways for each data acquisition cell. The communication pathways include a primary communication pathway and at least one backup communication pathway toward a data collection unit. The method may further include transmitting the communication pathways to each data acquisition cell deployed in the seismic field.

Described herein are implementations of various technologies for a method for transmitting seismic data in a seismic field. In one implementation, the method may include transmitting seismic data from a data acquisition cell to a first communication device and transmitting the seismic data from the data acquisition cell to a second communication device if no acknowledge receipt of the seismic data is received by the data acquisition cell from the first communication device.

Described herein are implementations of various technologies for a seismic data acquisition cell deployable in a seismic field. In one implementation, the seismic data acquisition cell may include a sensor, a processor and a memory having program instructions executable by the processor to: transmit seismic data from the data acquisition cell to a primary communication device and transmit the seismic data from the data acquisition cell to one or more backup communication devices if no acknowledge receipt of the seismic data is received by the data acquisition cell from the first communication device.

Described herein are implementations of various technologies for a seismic survey system, which may include a data collection unit and an array of data acquisition cells in communication with the data collection unit through a wireless network. At least one data acquisition cell may include a sensor, a processor and a memory having program instructions executable by the processor to transmit seismic data from the at least one data acquisition cell through a first communication pathway and transmit the seismic data from the at least one data acquisition cell to a second communication pathway if no acknowledge receipt of the seismic data is received by the at least one data acquisition cell through the first communication pathway.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

FIGS. 12A-C illustrate the redundancy of the communication pathways in the seismic recording array in accordance with implementations of various technologies described herein.

DETAILED DESCRIPTION

Figure 1:
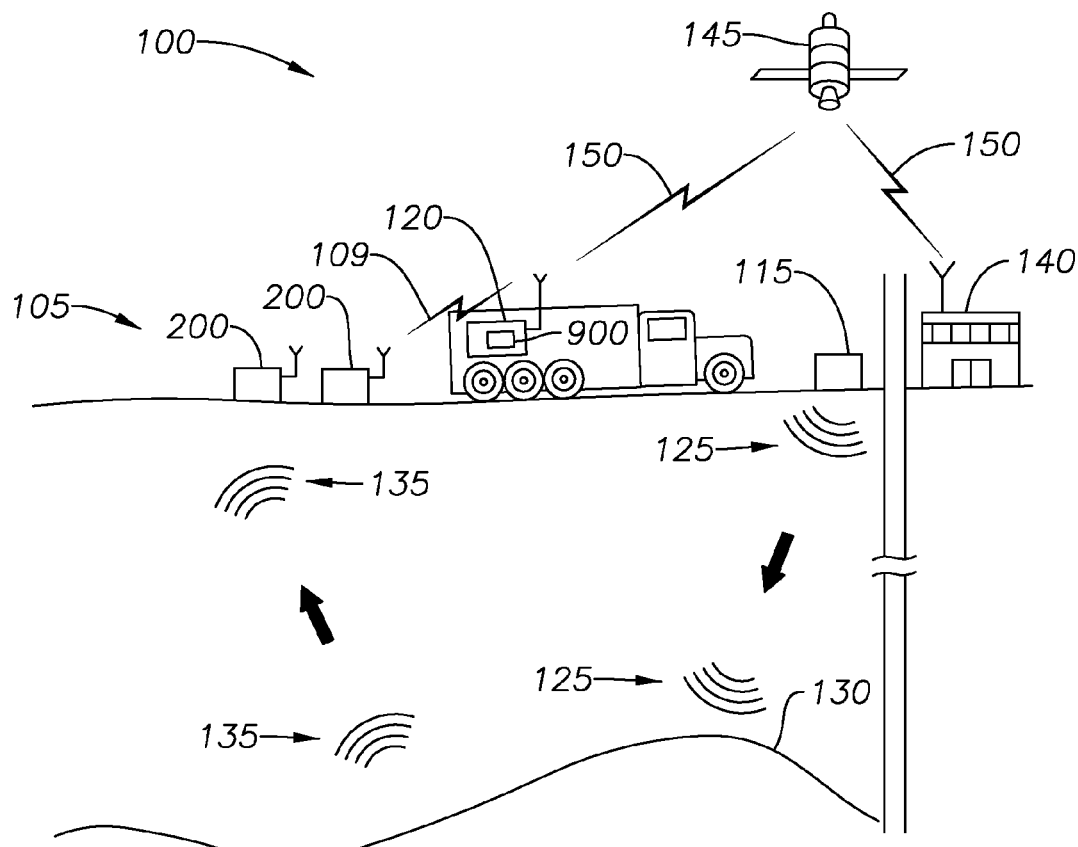
FIG. 1 illustrates a seismic acquisition system in accordance with implementations of various technologies described herein.

FIG. 1 illustrates a seismic acquisition system 100 in accordance with implementations of various technologies described herein. In one implementation, the seismic acquisition system 100 may include one or more seismic sources 115, a seismic recording array 105, a data collection unit 120 and a fixed-base facility 140. The seismic recording array 105 may include one or more Basic Data Acquisition Cells (BDACs) 200, which will be described in more detail in the paragraphs below with reference to FIG. 2. In operation, a source 115 may generate a plurality of seismic signals 125 in accordance with typical methods. The seismic signals 125 may be reflected by subterranean geological formations 130 and return to the BDACs 200. The BDACs 200 may then acquire and record the seismic signals 125. The BDACs 200 may then transmit the recorded seismic data via wireless links 109 to the data collection unit 120. This data may be transmitted directly to the data collection unit 120 or via other BDACs 200 as discussed below.

The data collection unit 120 may include one or more single recorder systems, which will be described in more detail in the paragraphs below with reference to FIG. 9. The data collection unit 120 may be configured to store, process and/or transmit the seismic data. The data from the data collection unit 120 may be transmitted to a fixed-base facility 140 via a satellite 145 and satellite links 150. Although the data collection unit 120 may be located centrally as depicted, the data collection unit 120 may also be distributed across the seismic acquisition system 100. Although only one data collection unit 120 is shown in FIG. 1, it should be understood that in some implementations, more than one data collection unit 120 may be used in the seismic acquisition system 100.

Figure 2A:
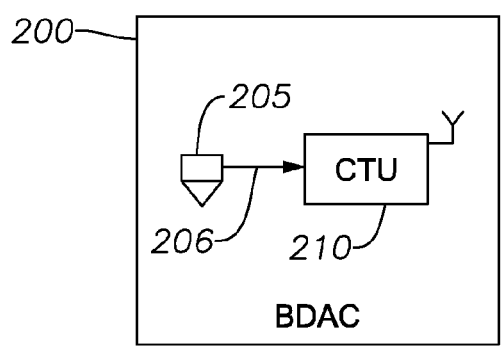
FIGS. 2A-D illustrate Basic Data Acquisition Cells (BDACs) in connection with implementations of various technologies described herein.
Figure 2B:
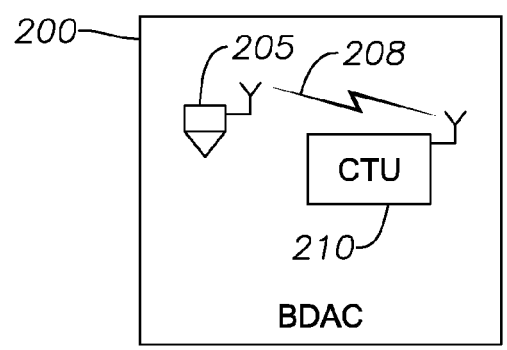
Figure 2C:
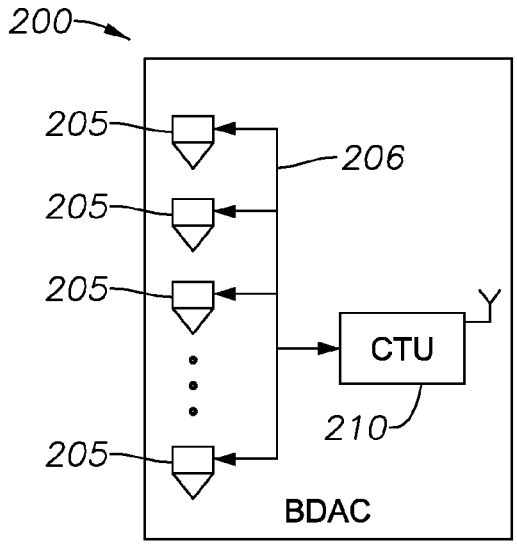
Figure 2D:
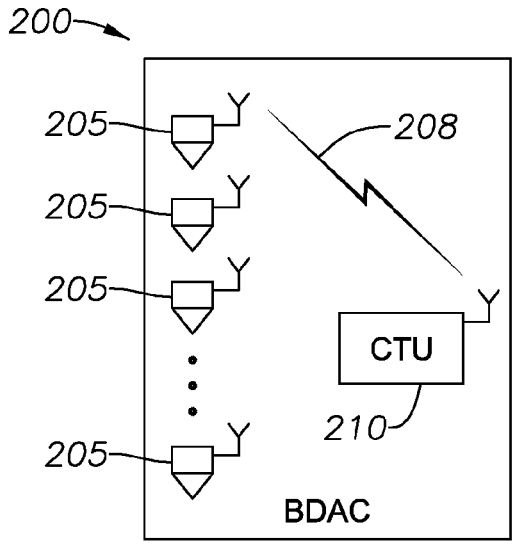

FIGS. 2A-D illustrate Basic Data Acquisition Cells (BDACs) 200 in connection with implementations of various technologies described herein. Each BDAC 200 may include a Central Transmission Unit (CTU) 210 and a seismic sensor 205. The seismic sensor 205 may include any type of sensors such as geophones, positioning devices, thermal sensors, pressure sensors and the like. The CTU 210 and sensor 205 may be in communication via a wire 206 as in FIG. 2A or via a wireless link 208 as in FIG. 2B. In one implementation, a plurality of sensors 205 may be used in a single BDAC 200. The sensors 205 may be connected to each other and the CTU 210 via wires 206, as shown in FIG. 2C, or via wireless links 208, as shown in FIG. 2D. In one implementation, regardless of the number of sensors 205 included in a single BDAC 200, each CTU 210 may digitize and transmit only one analog signal. It should be understood that in a seismic recording array 105, the number of sensors 205 in each BDAC 200 may vary.

Figure 3:
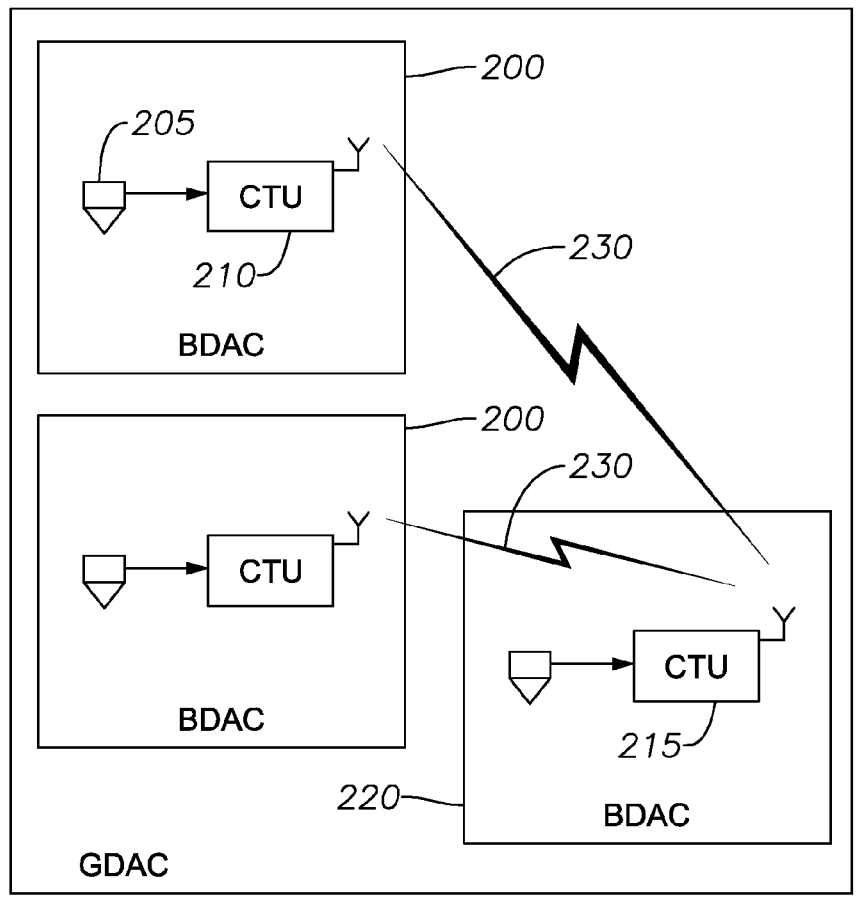
FIG. 3 illustrates a Grouped Data Acquisition Cell (GDAC) in connection with implementations of various technologies described herein.

FIG. 3 illustrates a Grouped Data Acquisition Cell (GDAC) 300 in connection with implementations of various technologies described herein. A plurality of BDACs 200 may be grouped together to form a GDAC 300. Within each GDAC 300, at least one BDAC 200 may be assigned to be the gateway BDAC 220. The gateway BDAC 220 may contain a CTU 215 configured to receive seismic data from the other CTUs 210 within the GDAC 300 and transmit the collected seismic data along with its own data to another GDAC 300 or the data collection unit 120. Other CTUs 210 may transmit seismic data to the gateway CTU 215 via a wireless link 230. It should be understood, however, that occasionally the CTUs 210 may connect to the gateway CTU 215 via cables or wires. In one implementation, all communication between any BDAC 200 and the data collection unit 120 may proceed through the assigned gateway BDACs 220. Although a GDAC 300 is illustrated as containing three BDACs 200, it should be understood that any number of BDACs 200 may be grouped in a GDAC 300. Moreover, in a given implementation the number of BDACs 200 comprising a GDAC 300 may vary from GDAC 300 to GDAC 300.

Figure 4A:
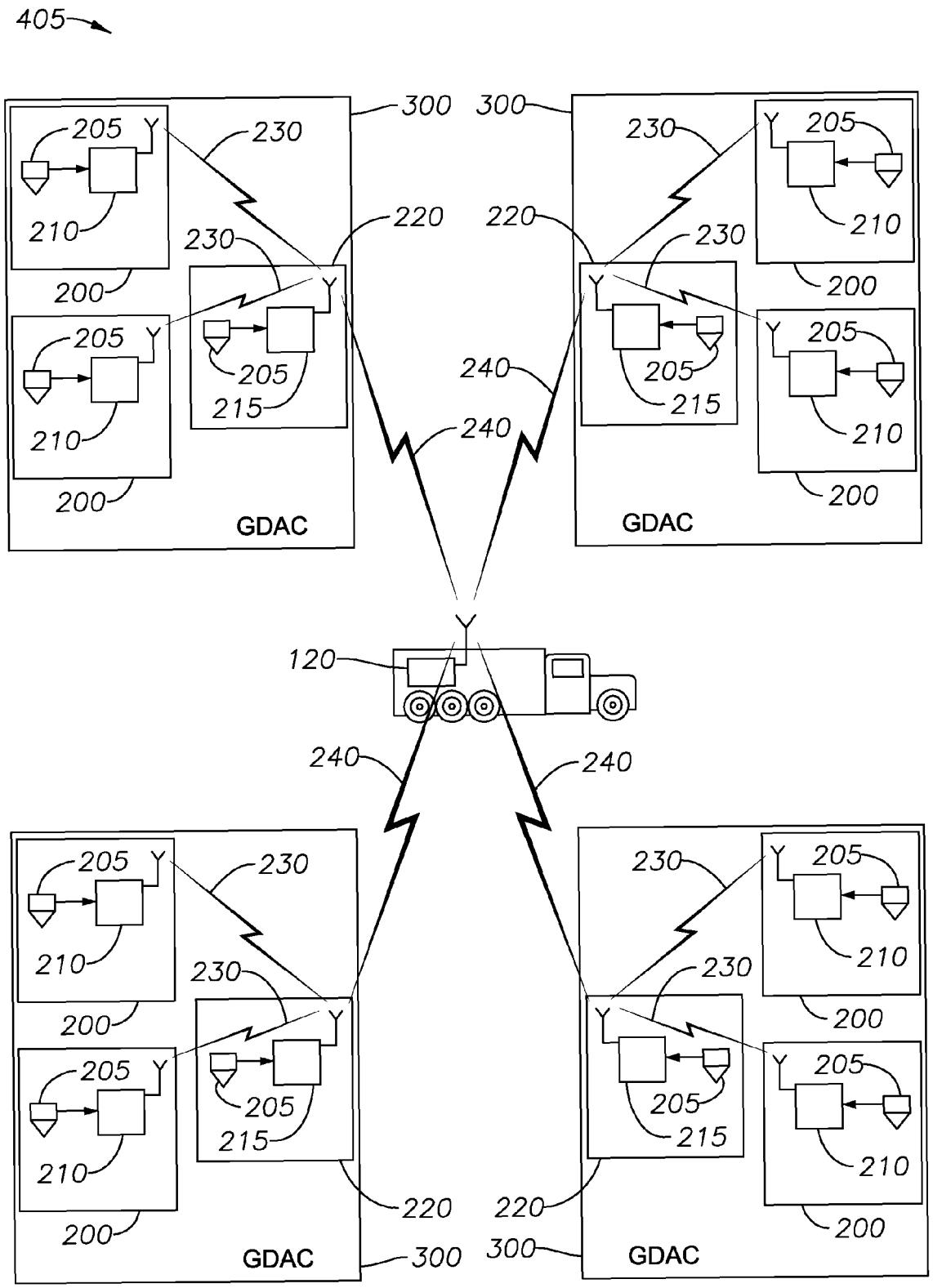
FIG. 4A-B illustrate seismic recording arrays in connection with implementations of various technologies described herein.
Figure 4B:
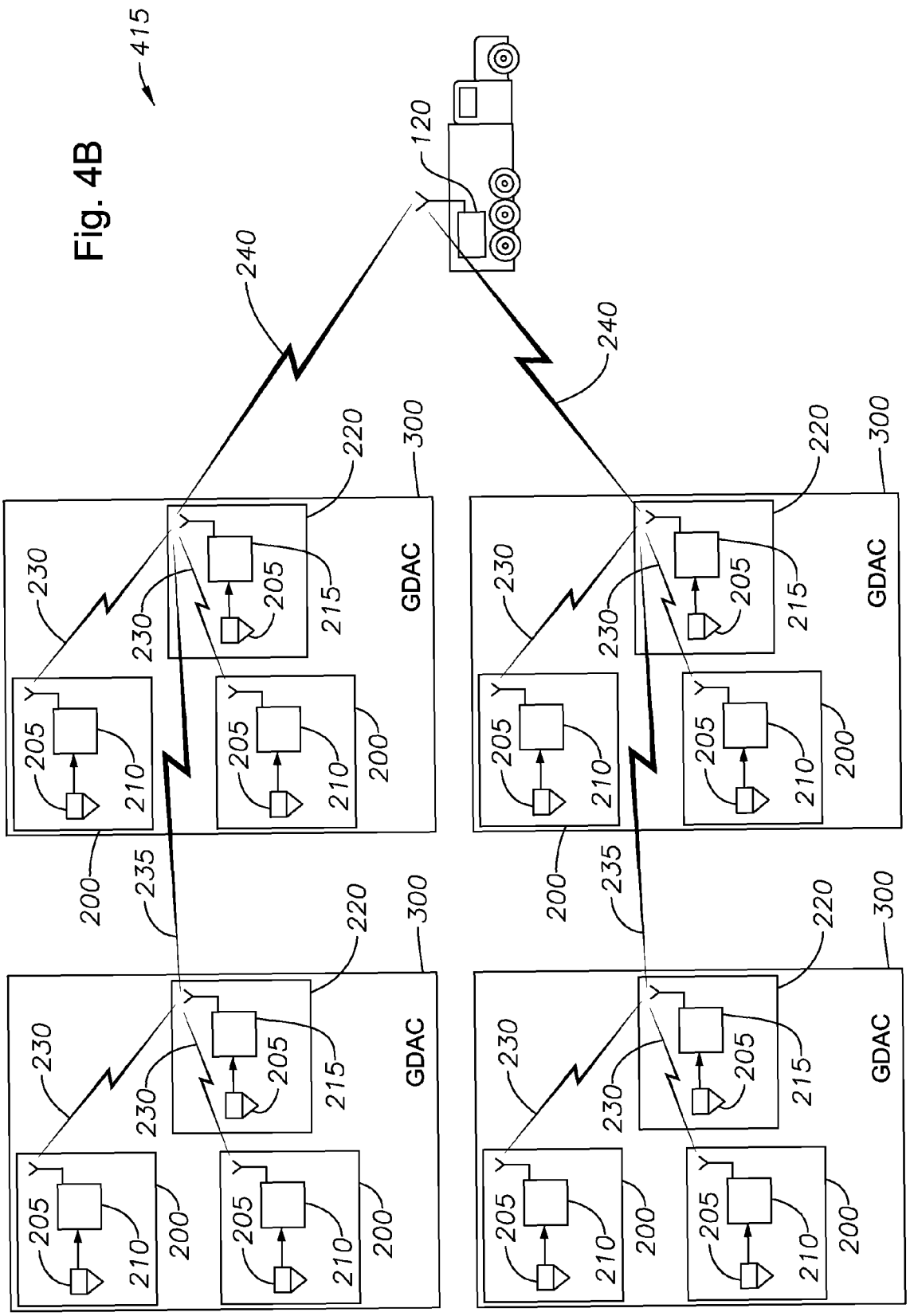

FIGS. 4A-B illustrate seismic recording arrays 405 and 415 in connection with implementations of various technologies described herein. The seismic recording arrays 405 and 415 may include a plurality of BDACs 200 grouped into GDACs 300. The number of BDACs 200 and GDACs 300 may vary by implementation. FIG. 4A illustrates one implementation in which several GDACs 300 make up a seismic recording array 405 in a small survey. In operation, the sensors 205 in each BDAC 200 and each gateway BDAC 220 may receive the seismic data. Each sensor 205 may transmit its data to the CTU 210 within the BDAC 200 or the CTU 215 within the gateway BDAC 220. In each GDAC 300, the non-gateway CTUs 210 may then send seismic data to the gateway CTU 215 via wireless links 230. Each BDAC 200 may wait for an acknowledgment from the gateway BDAC 220 that its data was received. The gateway CTUs 215 then transmit the collected seismic data to the data collection unit 120 via wireless links 240. The gateway BDACs 220 may wait for an acknowledgment from the data collection unit 120 that their data was received.

FIG. 4B illustrates another implementation in which several cascading GDACs 300 make up a seismic recording array 415 in a larger survey. In this implementation, each seismic sensor 205 collects seismic data and transmits the data to its CTU 210 or 215. Within each GDAC 300, the non-gateway CTUs 210 then transmit the seismic data to the gateway CTU 215. Each BDAC 200 may wait for an acknowledgment from the gateway BDAC 220 that its data was received. Each gateway CTU 215 then transmits the seismic data to the next GDAC 300 in the direction of the data collection unit 120 via wireless links 235. Each gateway CTU 215 may wait for an acknowledgment that its data was received. The seismic data may be transmitted wirelessly from one GDAC 300 to another in the direction of the data collection unit 120 until a GDAC 300 in close proximity of the data collection unit 120 receives the data. The GDACs 300 closest to the data collection unit 120 then transmit the seismic data directly to the data collection unit 120 via wireless links 240. Seismic data may be transmitted in this cascading fashion across the seismic recording array 415 to the data collection unit 120. The communication over the wireless links 230, 235 and 240 may employ frequency domain or time domain multiplexing techniques.

In one implementation, each GDAC 300 receives data transmitted by only one other GDAC 300. In another implementation, data may be transmitted between GDACs 300 in a continuous, or asynchronous, mode. In asynchronous mode, gateway BDAC $220_i$ may transmit to gateway BDAC $220_{i+1}$ when data is ready for transmission without regard for when gateway BDAC $220_{i+1}$ may transmit data to gateway BDAC $220_{i+2}$. In this mode, each gateway BDAC 220 may receive data transmitted to it, assemble it with its own data, and transmit the resultant data set to the next gateway BDAC 220 in the pathway until the data reaches the data collection unit 120. In another implementation, data may be transmitted in a discontinuous, or synchronous, mode. In synchronous mode, data may be transferred at predefined intervals. Half the gateway BDACs transmit data during one period with the remaining half transmitting during the next period. For example, data may be transmitted from gateway BDAC $220_i$ to gateway BDAC $220_{i+1}$ at the same time gateway BDAC $220_{i+2}$ transmits data to gateway BDAC $220_{i+3}$. In the next predefined period, data may be transferred from gateway BDAC $220_{i+1}$ to gateway BDAC $220_{i+2}$ at the same time gateway BDAC $220_{i+3}$ transmits data to gateway BDAC $220_{i+4}$.

Figure 5A:
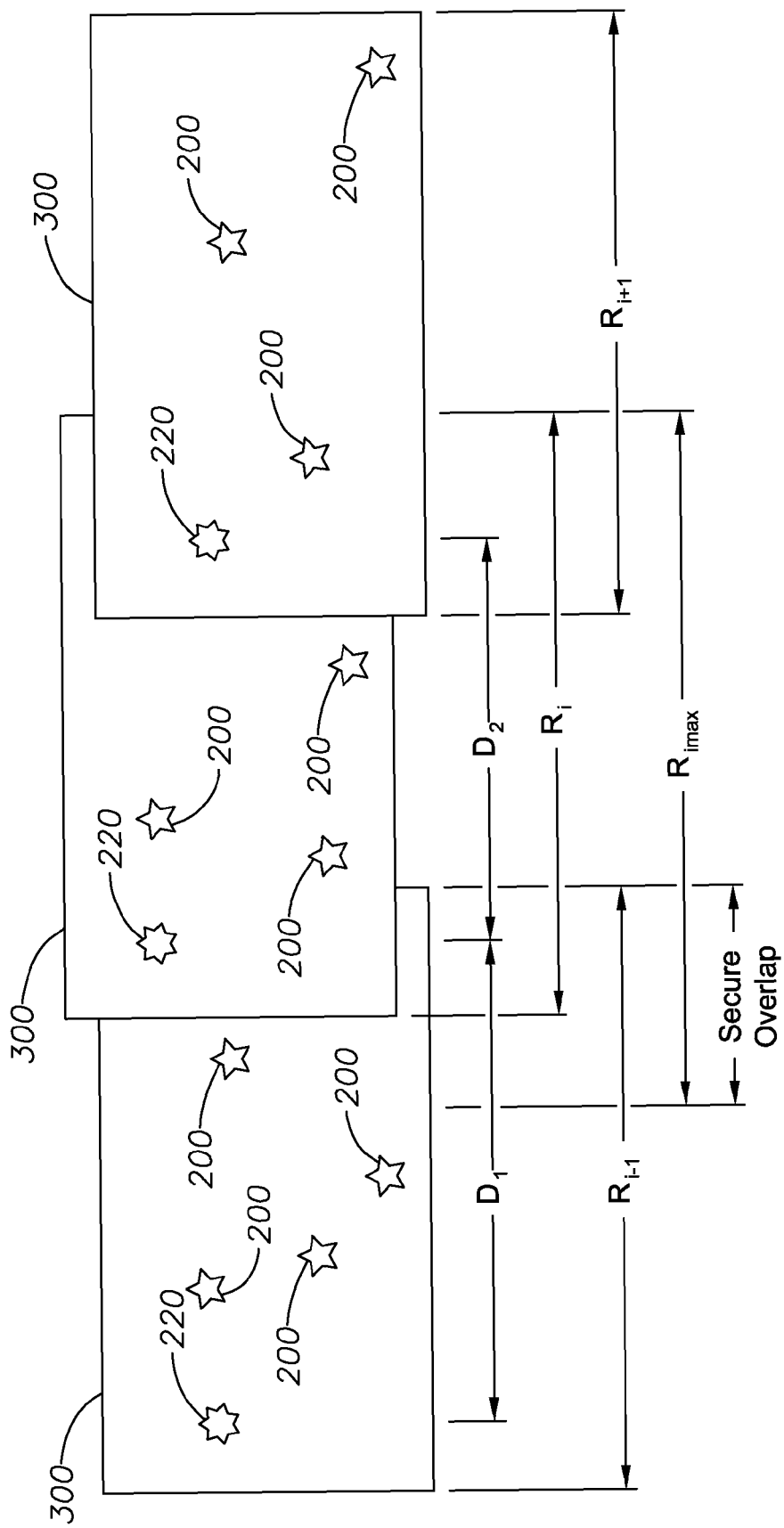
FIGS. 5A-C illustrate overlapping GDACs in connection with implementations of various technologies described herein.
Figure 5B:
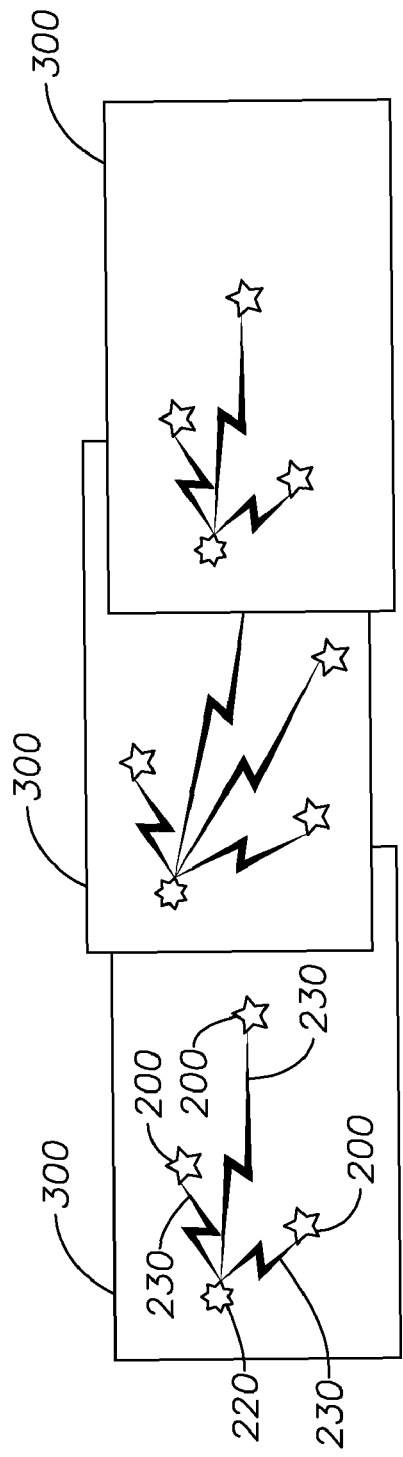
Figure 5C:
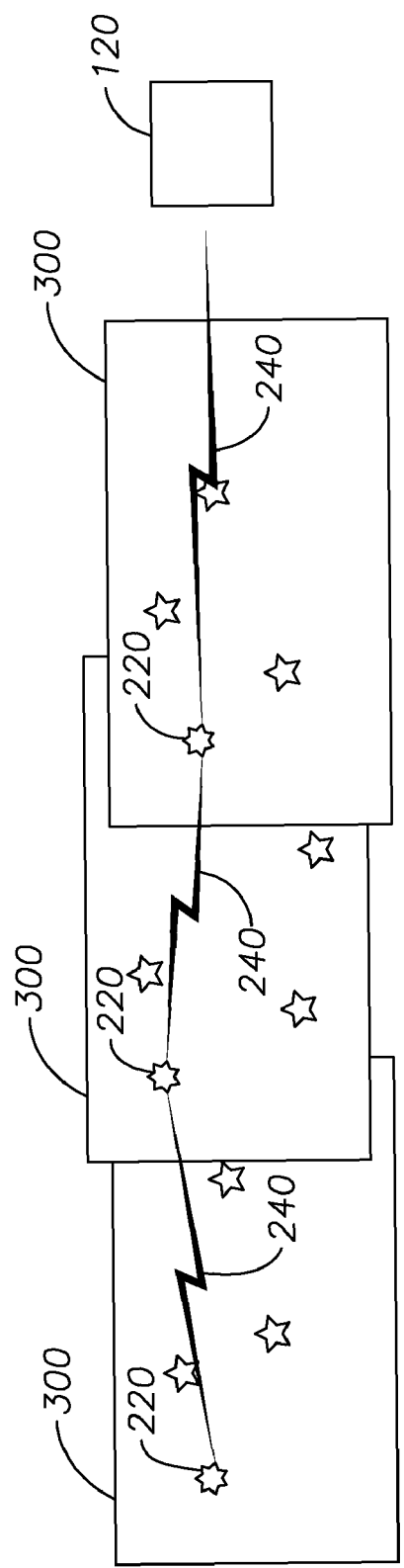

FIGS. 5A-C illustrate overlapping GDACs 300 in connection with implementations of various technologies described herein. In FIGS. 4A-B, the GDACs 300 were not overlapping; however, where increased transmission bandwidth is desired, two or more GDACs 300 may overlap as shown in FIG. 5A. In FIG. 5A, each GDAC 300 may be made up of one gateway BDAC 220 and a plurality of non-gateway BDACs 200. FIG. 5B illustrates communication from the non-gateway BDACs 200 to the gateway BDAC 220 within each GDAC 300 via wireless links 230. FIG. 5C illustrates the communication between GDACs 300 and the data collection unit 120 via the gateway BDACs 220 and wireless links 240. In FIG. 5A, each GDAC 300 may have a coverage range, R. The coverage range R of each GDAC may be less than the maximum coverage range, $R_{max}$, to ensure secure overlap which provides a spatial margin for error in data transmission. In addition, the distance D between BDAC gateways 220 may impact operation performance. For example, using the 802.11 communication protocol (discussed below), the distance D between gateway BDACs 220 may impact data transfer rates as described in Table 1.

TABLE 1

| Distance Between Gateway BDACs D vs. Bit Rates | | | | | | | | |
|---|---|---|---|---|---|---|---|---|
| | Distance-D | | | | | | | |
| | 750 m | 500 m | 250 m | 200 m | 60 m | 50 m | 35 m | 25 m |
| Outdoor-11 Mbps | 1 Mbps | 2 Mbps | 5.5 Mbps | 11 Mbps | 11 Mbps | 11 Mbps | 11 Mbps | 11 Mbps |

The data in Table 1 may change with improvements to the transceiver system (e.g., more power, higher or better antennae, different transmission algorithm and the like), the seismic survey equipment and/or the protocol used.

Figure 6:
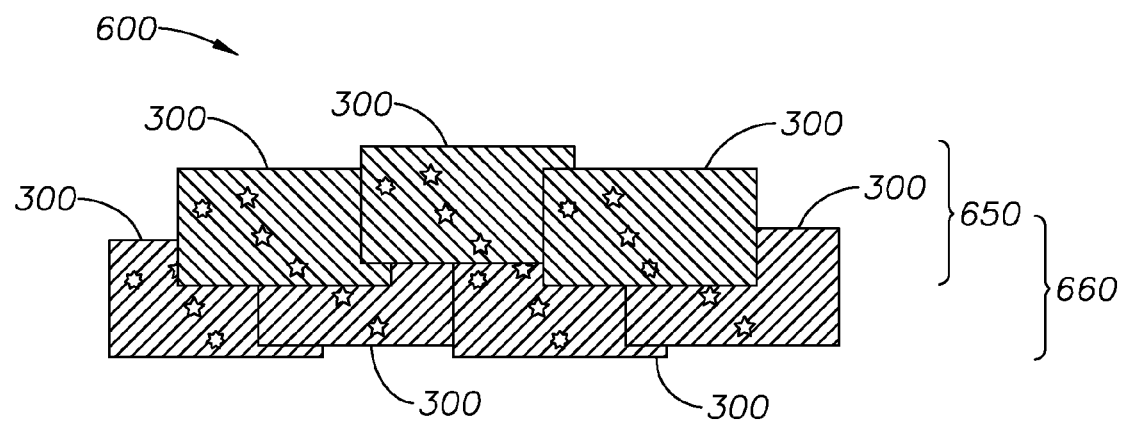
FIG. 6 illustrates interleaved GDACs using more than one carrier frequency in connection with implementations of various technologies described herein.

FIG. 6 illustrates interleaved GDACs 300 using more than one carrier frequency in connection with implementations of various technologies described herein. In one implementation 600, various GDACs 300 may be interleaved as illustrated in FIG. 7. The GDACs 300 along different communication lines may use different carrier frequencies as indicated by the different hatch patterns. Line 650 communicates on a first carrier frequency and line 660 communicates on a second frequency. A plurality of frequencies may be used depending on the communication protocol employed.

Figure 7B:
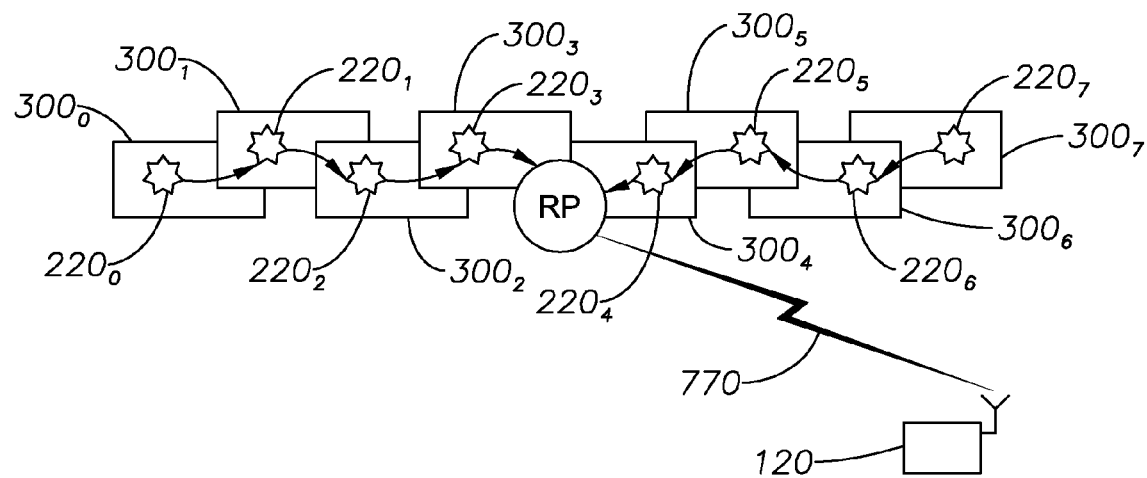
FIG. 7A-B illustrate the use of relay points to accommodate larger surveys in connection with implementations of various technologies described herein.
Figure 7A:
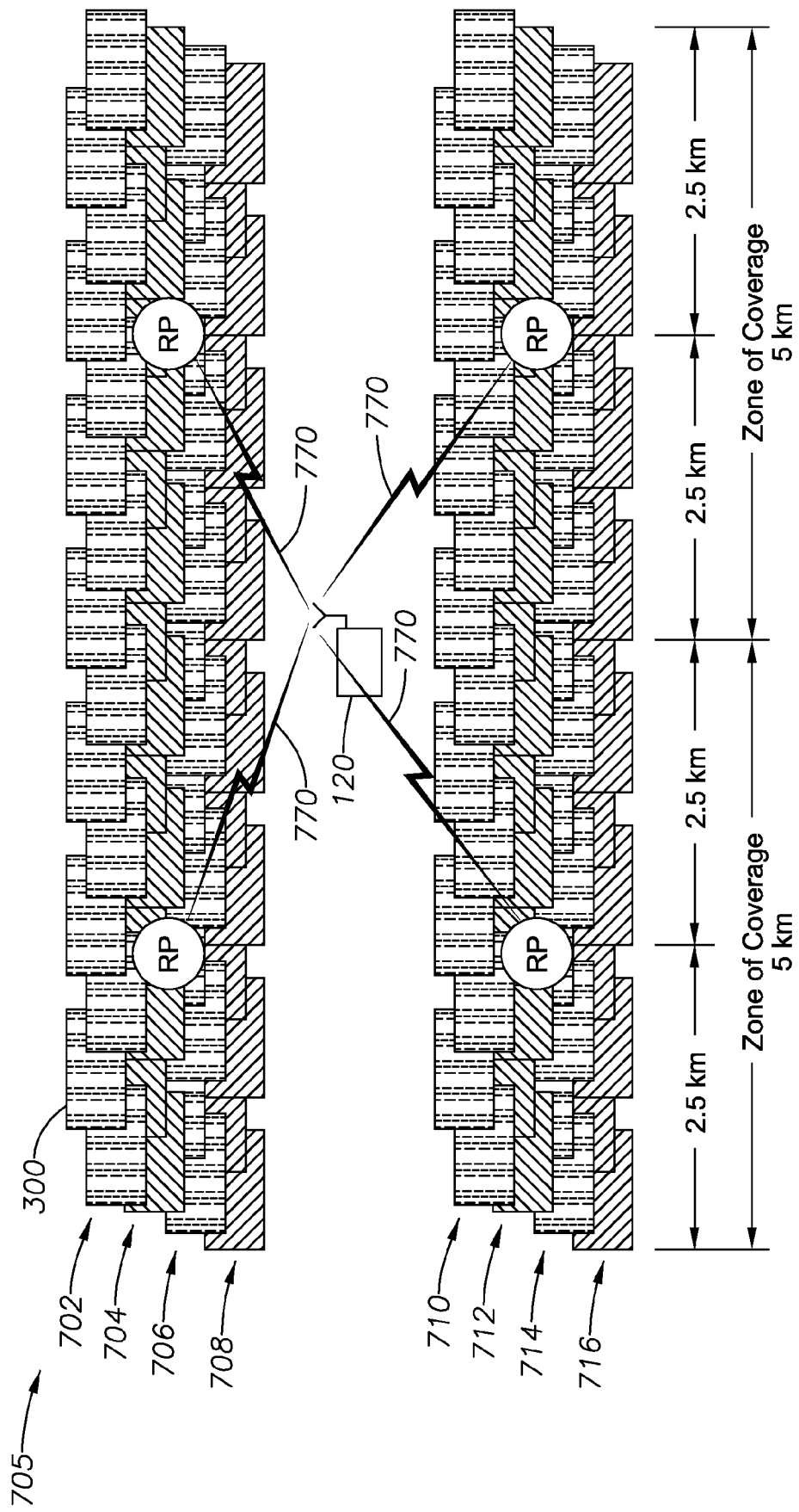

FIGS. 7A-B illustrate the use of relay points (RP) to accommodate larger surveys in connection with implementations of various technologies described herein. Because there may be a limit to the amount of data a single frequency may carry, relay points (RP) may be added to the seismic recording array in larger surveys. The relay points (RP) transmit the data directly to the data collection unit 120 to offload the frequencies and increase bandwidth. FIG. 7A illustrates one implementation of a seismic recording array 705 for a 10 km long survey. In this seismic recording array 705, the survey may be divided into two 5 km zones of coverage. Relay points (RP) may be positioned to roughly divide these zones of coverage into 2.5 km sections. The relay points (RP) may act as wireless bridges between the GDACs 300 and the data collection unit 120. Any suitable device may be used as the relay point (RP). For example, a Cisco Aironet 340 Series Wireless Bridge may be used. The survey may be further divided into 8 communication lines 702-716 of GDACs 300. Each line 702-716 operates on one of four carrier frequencies as indicated by the four different hatching patterns. For instance, lines 702 and 710 operate on a first carrier frequency.

FIG. 7B illustrates the operation of one communication line in the survey illustrated in FIG. 7A. In this implementation, each GDAC 300 transmits its data in the asynchronous mode via the gateway BDACs 220. For example, gateway BDAC $220_0$ transmits collected data from GDAC $300_0$ to gateway BDAC $220_1$. Gateway BDAC $220_1$ then transmits the collected data from GDAC $300_1$ as well as GDAC $300_0$ to the gateway BDAC $220_2$. Gateway BDAC $220_2$ continues by adding its data and transmitting all the data to gateway BDAC $220_3$. Gateway BDAC $220_3$, however, adds its own data and then transmits the data to the relay point (RP). Similarly, the collected data from GDACs $300_7$, $300_6$, $300_5$, and $300_4$ may be transmitted to the relay point (RP). The relay point (RP) may then transmit the data to the data collection unit 120 via a wireless link 770. In FIG. 7A, each relay point (RP) serves one zone of coverage for one set of communication lines using each of the four carrier frequencies. Therefore, each relay point (RP) receives and transmits data from two gateway BDACs 220 per frequency. Although a 10 km survey is illustrated, it should be understood that any size survey may be conducted. In addition, it should be understood that relay points (RP) may not necessarily divide areas of the survey in half.

Although the illustrated implementations depict substantially linear communication pathways with rectangular BDACs and GDACs arranged in horizontal lines, it should be understood that communication pathways may be non-linear, BDACs and GDACs may have other geometries and may be arranged in any manner. Further, the BDACs, GDACs and other components related thereto are provided in more detail in commonly assigned U.S. patent application Ser. No. 10/532,644, filed 25 Apr. 2005, which is incorporated herein by reference.

Figure 8:
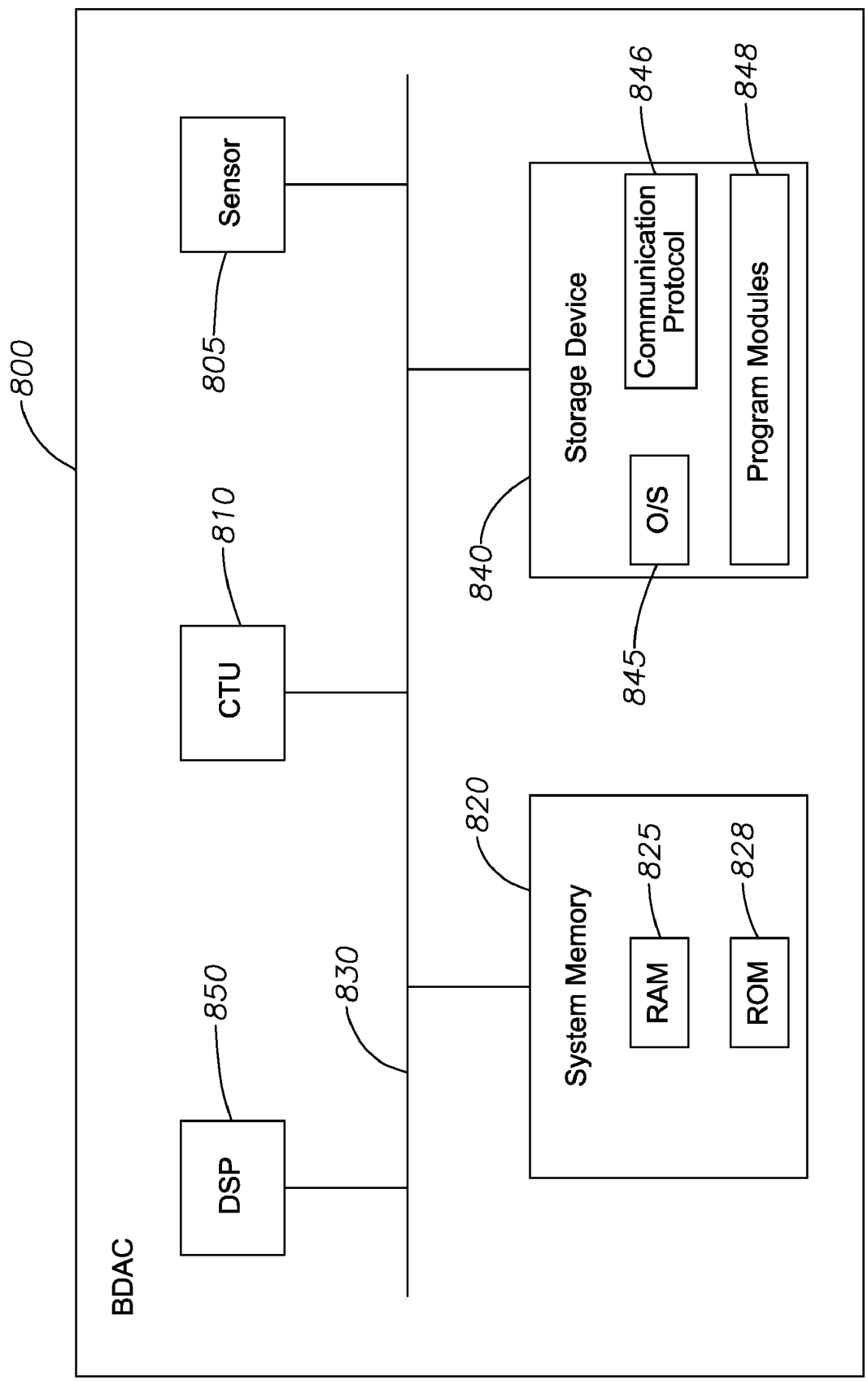
FIG. 8 illustrates a schematic diagram of a computer system as a Basic Data Acquisition Cell (BDAC) in connection with implementations of various technologies described herein.

In one implementation, each BDAC may be a computer system, such as computer system 800 shown in FIG. 8. As such, the BDAC 800 may include a digital signal processor 850, a system memory 820, a central transmission unit (CTU) 810, a sensor 805, a storage device 840 and a system bus. The digital signal processor 850 may include a microprocessor. The system memory 820 may include a random access memory (RAM) 825 and a read-only memory (ROM) 828. A basic input/output system containing the basic routines that help to transfer information between components within the computer, such as during startup, may be stored in the ROM 828.

The BDAC 800 may include a sensor 805. In one implementation the sensor may be configured to detect seismic energy in the form of ground motion or a pressure wave in fluid and transform it to an electrical impulse. The sensor 805 may also be commonly referred to in the seismic acquisition industry as a receiver. Those skilled in the art will appreciate that various types of sensors may be practiced in implementations of various technologies described herein. Further, although the BDAC 800 may be described as having one sensor 805, it should be understood that, in some implementations, the BDAC 800 may have more than one sensor 805. Although the sensor 805 may be illustrated as connecting to the system bus 830, the sensor may be connected via a wireless connection in other implementations.

The BDAC 800 may further include a storage device 840 for storing an operating system 845, a communication protocol 846, and program modules 848 executable by the digital signal processor 850. The operating system 845 may be configured to control the operation of the BDAC 200. In one implementation, the operating system may be a real time operating system such as Real Time Linux, VxWorks, GreenHills, ThreadX, and the like.

The communication protocol 846 may use the 802.11 standard. The 802.11 standard is a family of specifications developed by the Institute of Electrical and Electronics Engineers ("IEEE") for wireless local area network ("LAN") technology. 802.11 specifies an over-the-air interface between a wireless client and a base station or between two wireless clients. There are several specifications in the 802.11 standard, including:

- 802.11, which applies to wireless LANs and provides 1 or 2 Mbps transmission in the 2.4 GHz band using either frequency hopping spread spectrum ("FHSS") or direct sequence spread spectrum ("DSSS").
- 802.11a, which is an extension to 802.11 that applies to wireless LANs and provides up to 54 Mbps in the 5 GHz band. 802.11a uses an orthogonal frequency division multiplexing encoding scheme rather than FHSS or DSSS.
- 802.11b, also referred to as "802.11 High Rate" or "Wi-Fi", which is an extension to 802.11 that applies to wireless LANS and provides 11 Mbps transmission (with a fallback to 5.5, 2 and 1 Mbps) in the 2.4 GHz band. 802.11b uses only DSSS.
- 802.11g, which applies to wireless LANs and provides 20+ Mbps in the 2.4 GHz band.

The 802.11 standard may be very advantageous for use in seismic acquisition because it allows for higher bandwidth with lower power usage. In one implementation, the 802.11 protocol may be used for the wireless communication between the sensor 805 and the CTU 810 within a BDAC 200. Further, the 802.11 protocol may be used for communication between the BDACs 200 and the gateway BDACs 220, as well as between the GDACs 300 via the gateway BDACs 220. Finally, the 802.11 may be used for communication between the GDACs 300 and the data collection unit 120. Although the above referenced implementations are described with reference to the 802.11 protocols, it should be understood that some implementations may use other types of communication protocols, such as GSM, WAP and the like.

Referring back to FIG. 8, the storage device 840 may be connected to the digital signal processor 850 through the system bus 830. The storage device 840 and its associated computer-readable media may be configured to provide non-volatile storage for the BDAC 200. Those skilled in the art will appreciate that computer-readable media may refer to any available media that can be accessed by the BDAC 800. For example, computer-readable media may include computer storage media and communication media. Computer storage media includes volatile and non-volatile, and removable and non-removable media implemented in any method or technology for storage of information such as computer-readable instructions, data structures, program modules or other data. Computer storage media further includes, but is not limited to, RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the BDAC 800.

The BDAC 800 communicates through a Central Transmission Unit (CTU) 810 connected to the system bus 830. It should be understood that the CTU 810 may be configured to connect to the sensor 805 via any type of communications network, including a wireless network. It should be understood that the above description of a BDAC 800 may also apply to the gateway BDAC. It should also be understood that the description of the CTU 810 may apply to non-gateway CTUs as well as to gateway CTUs.

Figure 9:
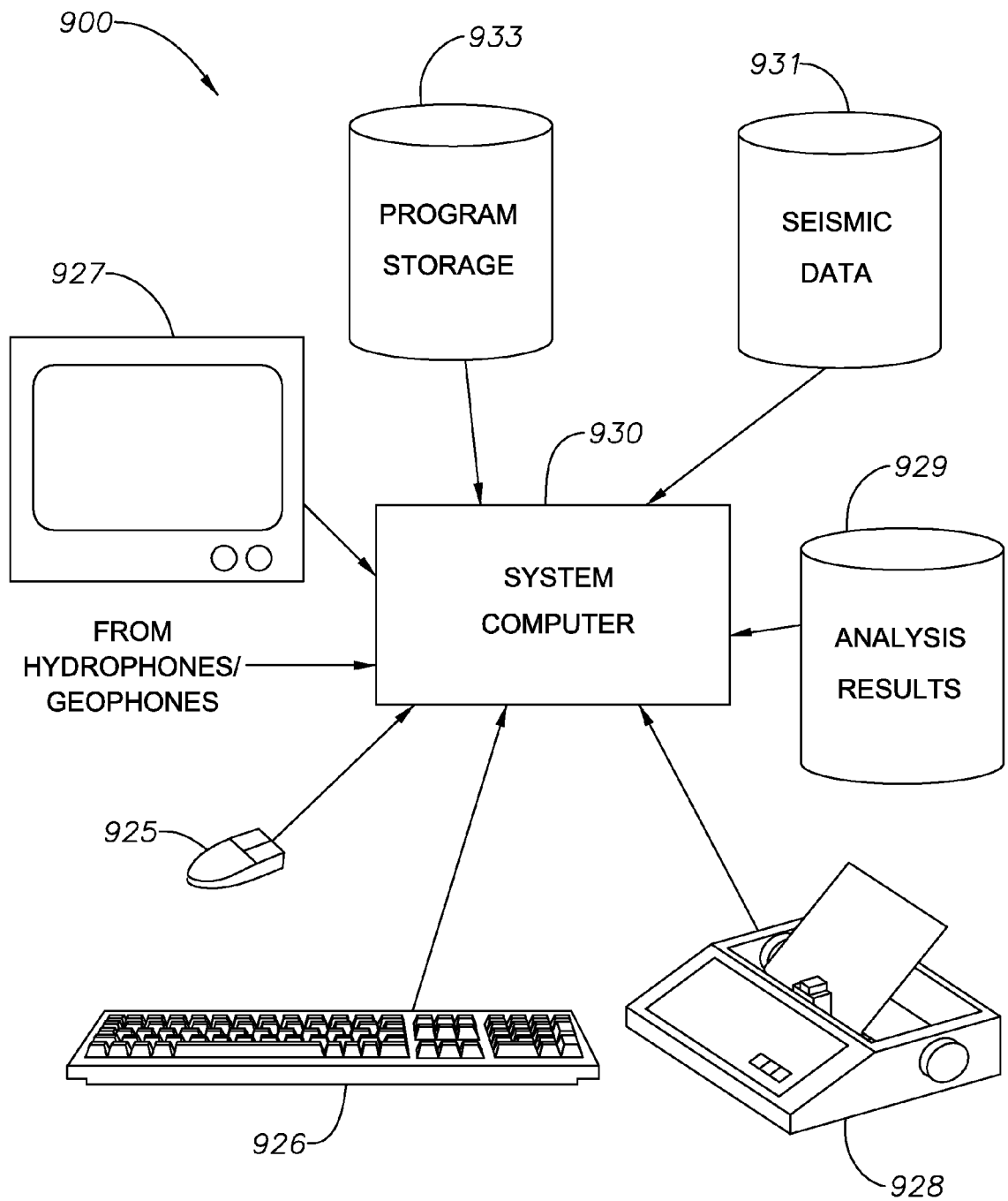
FIG. 9 illustrates a schematic diagram of a recorder system in accordance with implementations of various technologies described herein.

FIG. 9 illustrates a schematic diagram of a recorder system 900 in accordance with implementations of various technologies described herein. The recorder system 900 may include a system computer 930, which may be implemented as any conventional personal computer or server. However, those skilled in the art will appreciate that implementations of various technologies described herein may be practiced in other computer system configurations, including hypertext transfer protocol (HTTP) servers, hand-held devices, multiprocessor systems, microprocessor-based or programmable consumer electronics, network PCs, minicomputers, mainframe computers, and the like.

The system computer 930 may be in communication with disk storage devices 929, 931, and 933, which may be external hard disk storage devices. It is contemplated that disk storage devices 929, 931, and 933 are conventional hard disk drives, and as such, will be implemented by way of a local area network or by remote access. Of course, while disk storage devices 929, 931, and 933 are illustrated as separate devices, a single disk storage device may be used to store any and all of the program instructions, measurement data, and results as desired.

In one implementation, seismic data from the sensors may be stored in disk storage device 931. The system computer 930 may retrieve the appropriate data from the disk storage device 931 to process seismic data according to program instructions that correspond to implementations of various technologies described herein. The program instructions may be written in a computer programming language, such as C++, Java and the like. The program instructions may be stored in a computer-readable medium, such as program disk storage device 933. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the recorder system 900. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

In one implementation, the system computer 930 may present output primarily onto graphics display 927, or alternatively via printer 928. The system computer 930 may store the results of the methods described above on disk storage 929, for later use and further analysis. The keyboard 926 and the pointing device (e.g., a mouse, trackball, or the like) 925 may be provided with the system computer 930 to enable interactive operation.

The system computer 930 may be located in the data collection unit 120 or at a fixed based facility 140, as shown in FIG. 1. The system computer 930 may be in communication with the sensors (either directly or via a recording unit, not shown), to receive signals indicative of the reflected seismic energy. These signals, after conventional formatting and other initial processing, may be stored by the system computer 930 as digital data in the disk storage 931 for subsequent retrieval and processing in the manner described above. While FIG. 9 illustrates the disk storage 931 as directly connected to the system computer 930, it is also contemplated that the disk storage device 931 may be accessible through a local area network or by remote access. Furthermore, while disk storage devices 929, 931 are illustrated as separate devices for storing input seismic data and analysis results, the disk storage devices 929, 931 may be implemented within a single disk drive (either together with or separately from program disk storage device 933), or in any other conventional manner as will be fully understood by one of skill in the art having reference to this specification.

Figure 10:
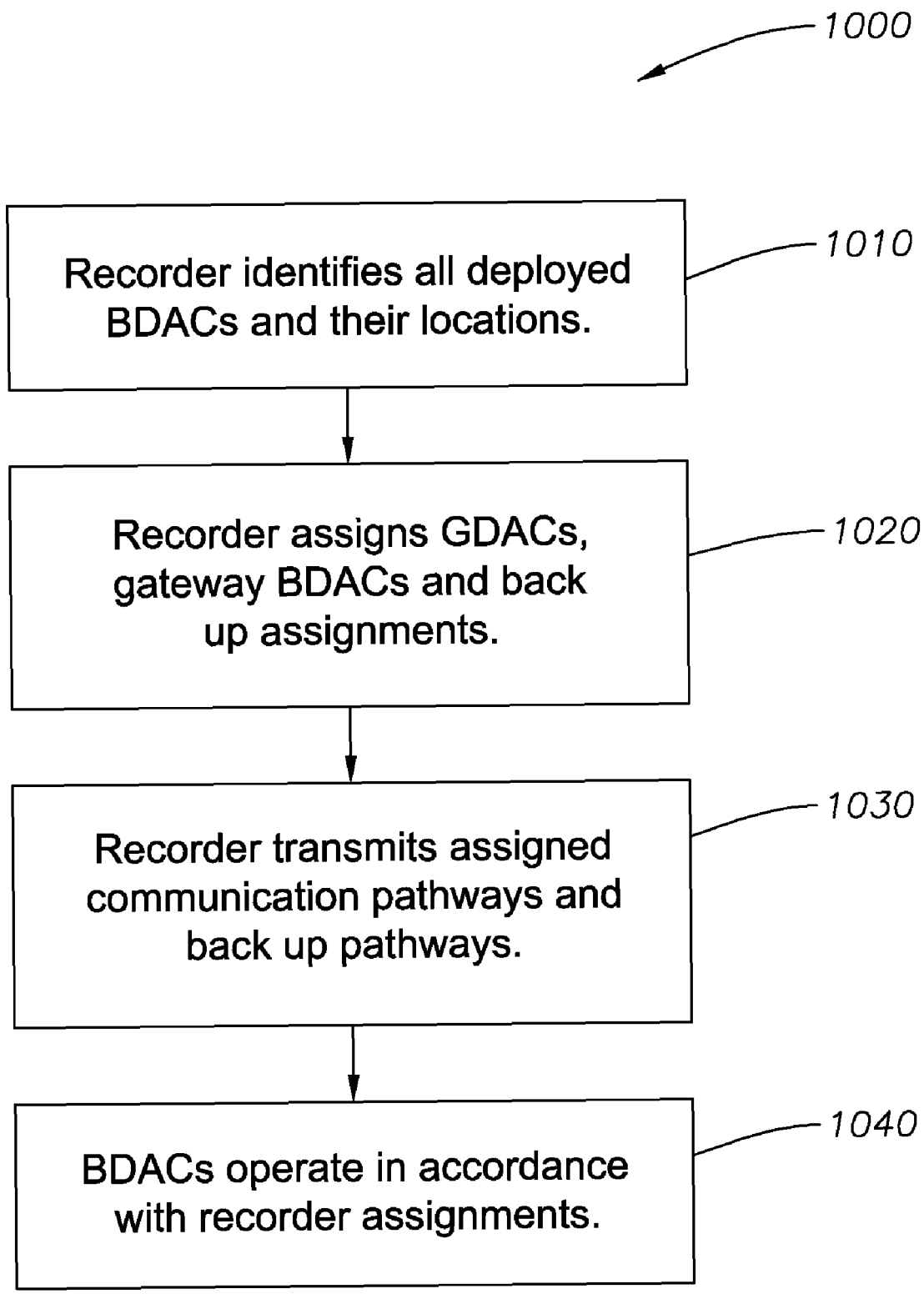
FIG. 10 illustrates a flow diagram for establishing communication pathway redundancy between BDACs and the data collection unit in accordance with implementations of various technologies described herein.

FIG. 10 illustrates a flow diagram for establishing communication pathway redundancy between BDACs 200 and the data collection unit 120 in accordance with implementations of various technologies described herein. It should be understood that while the operational flow diagram 1000 indicates a particular order of execution of the operations, in other implementations, the operations might be executed in a different order. In a seismic recording array, various BDACs 200 or 220 may fail during acquisition causing loss of time and increased costs. To enhance reliability and avoid downtime, communication pathway redundancy may be established.

At step 1010, a recorder system 900 of the data collection unit 120 may identify and locate all BDACs 200. This may be accomplished by various methods. In one implementation, surveyors may input the coordinates into each BDAC 200 as it is deployed. Then the recorder system 900 may send an interrogate command requesting the MAC (Media Access Control) address and coordinates of each BDAC 200 that received the command. The BDACs 200 may respond to the command and transmit the requested data. In this implementation, each BDAC 200 may repeat the interrogate command to the BDACs 200 in close proximity such that the command may be relayed to the ends of the survey area. Likewise, responses to the recorder system 900 may also be relayed back to the recorder system 900 via other BDACs 200. In this manner a map of the BDACs 200 may be built up within the recorder system 900.

In another implementation, BDACs 200 may be deployed without having their coordinates inputted. The recorder system 900 may send an interrogate command to surrounding BDACs 200 that do not know their location. In this case, the interrogate command may request the MAC address of each BDAC 200. The recorder system 900 may then record the MAC address and signal strength of each BDAC's 200 response. Because the signal strength may be proportionate to the distance between the BDACs 200 and the recorder system 900, the recorder system 900 may then deduce the relative positions of the BDACs 200 by comparing the signal strengths. In this implementation, the interrogate command may be broadcast from the recorder system 900 and repeated by the BDACs 200 in concentric circles until the survey area has been covered. The MAC address and signal strength may then be relayed back to the recorder system 900. The recorder system 900 may then deduce a map of the relative BDAC 200 locations.

At step 1020, the recorder system 900 may create a table describing the various communication pathways for each BDAC 200. The recorder system 900 may group BDACs 200 into GDACs 300 and assign certain BDACs 200 to act as gateway BDACs 220. The recorder system 900 may then define to which gateway BDAC 220 each non-gateway BDAC 200 will transmit their data and configure each BDAC 200 with IP addresses. Each BDAC 200 may be assigned to transmit to one specific gateway BDAC 220. Further, the recorder system 900 may then define the cascading order of the gateway BDACs 220. Each gateway BDAC 220 may be assigned to transmit to one specific gateway BDAC 220 in the direction of the data collection unit 120. The recorder system 900 may further define a back up gateway BDAC 220 for each BDAC 200 and gateway BDAC 220. The recorder system 900 may further define a second back up gateway BDAC 220 for each BDAC 200 and gateway BDAC 220. This may be repeated until as many back up assignments have been defined as desired.

At step 1030, the recorder system 900 may then transmit the communication assignments and back up assignments to each BDAC 200 and gateway BDAC 220. In one implementation, the recorder system 900 may transmit specific assignments to each BDAC 200 and gateway BDAC 220. In another implementation, the recorder system 900 may transmit the entire table to all BDACs 200 and gateway BDACs 220. In yet another implementation, the recorder system 900 may transmit the communication assignment data to the closest gateway BDACs 220 requesting that all gateway BDACs 220 repeat the transmission until the survey area is covered.

At step 1040, all BDACs may perform in accordance with the communication pathway assignments. In this manner, a plurality of redundant pathways may be established for each BDAC 200 and 220. In one implementation, the BDACs 200 and gateway BDACs 220 may be positioned in a grid with up to approximately 50 meters between BDACs 200 and/or 220. As stated in Table 1 above, the 802.11 protocol establishes a communication speed of 11 Mbps for up to 200 meters between wireless nodes. As such, a plurality of receivers would be within range for each BDAC 200 or gateway BDAC 200. In the event that one or more BDACs 200 or gateway BDACs 220 becomes unavailable and fails to acknowledge receipt of data, the BDACs 200 or gateway BDACs 220 transmitting to those unavailable gateway BDACs 220 would refer to their back up table and begin transmitting to a back up gateway BDAC 220. The recorder system would have established a back up assignment table for each BDAC 200 or 220 that would include BDACs which would be within the range of 200 meters. In this manner, the network may continue to function with failed BDACs 200 or 220, while maintenance teams may be deployed to repair issues without causing production downtime.

Figure 11:
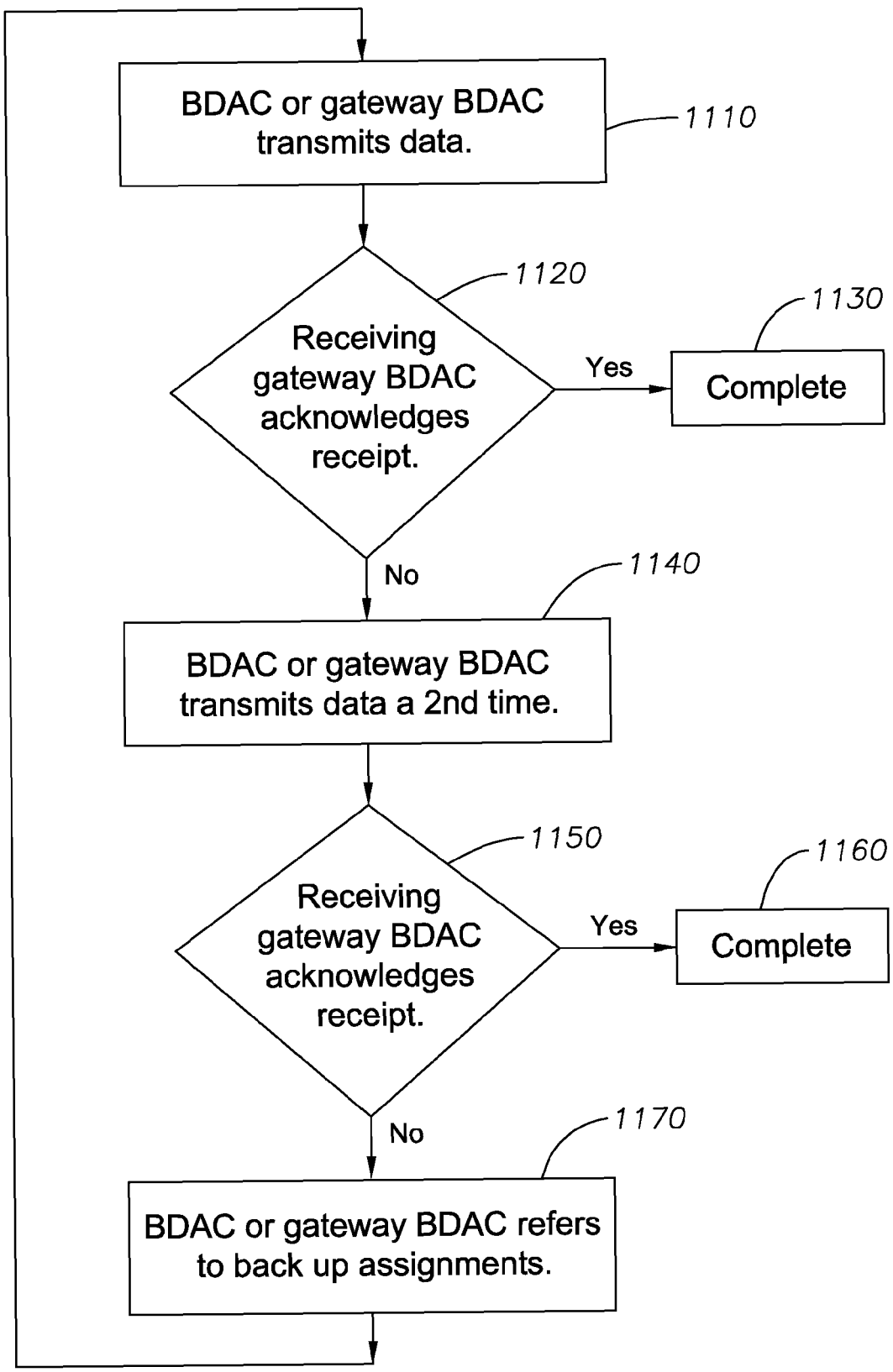
FIG. 11 illustrates a flow diagram for communication between Basic Data Acquisition Cells (BDACs) that ensures communication pathway redundancy in accordance with implementations of various technologies described herein.

FIG. 11 illustrates a flow diagram for communication between Basic Data Acquisition Cells (BDACs) 200 and 220 that ensures communication pathway redundancy in accordance with implementations of various technologies described herein. At step 1110, a BDAC 200 or gateway BDAC 220 may transmit its data to the assigned gateway BDAC 220. At step 1120, the receiving gateway BDAC 220 may either acknowledge receipt of the data or not respond. If the gateway BDAC 220 acknowledges receipt, at step 1130 the process may be complete. If the gateway BDAC 220 does not acknowledge receipt of the transmitted data, at step 1140 the transmitting BDAC 200 or gateway BDAC 220 may transmit the data for a second time. At step 1150, the receiving gateway BDAC 220 may acknowledge receipt of the data or not respond. If the receiving gateway BDAC 220 acknowledges the receipt of the data, at step 1160 the process may be complete. If the receiving gateway BDAC 220 fails to acknowledge receipt of the data again, at step 1170 the transmitting BDAC 200 or gateway BDAC 220 may then refer to its back up assignment and begin the cycle again transmitting to its back up gateway BDAC 220. It should be understood that although in this flow diagram the transmitting BDAC 200 or gateway BDAC 220 makes two attempts to contact the receiving gateway BDAC 220, the BDAC 200 or gateway BDAC 220 may be programmed to make any number of attempts before referring to its back up assignment.

Figure 12C:
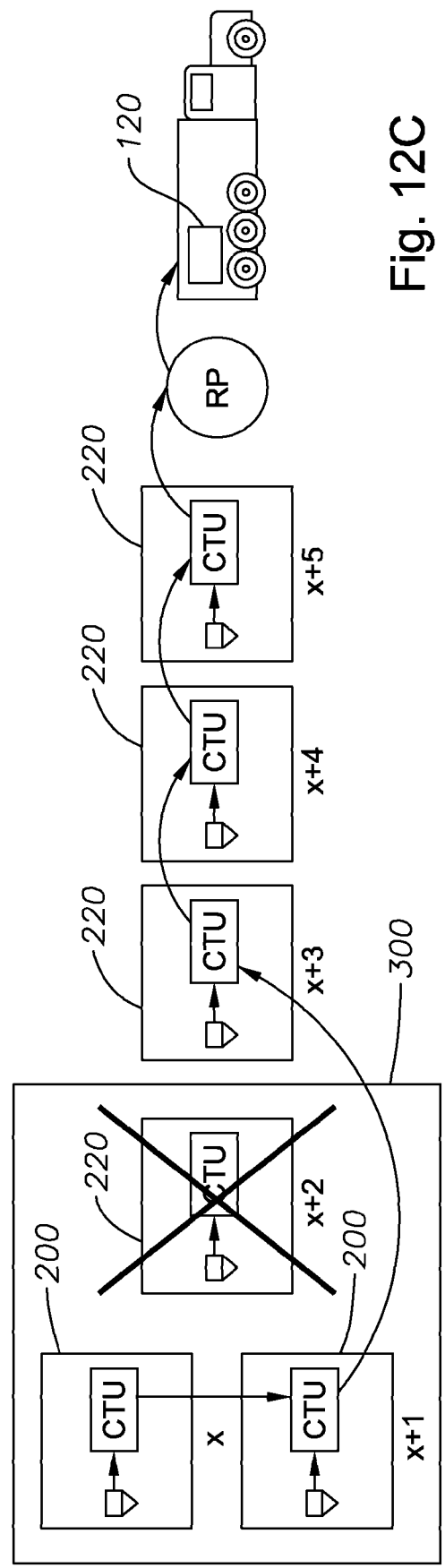

FIGS. 12A-C illustrate the redundancy of the communication pathways in the seismic recording array in accordance with implementations of various technologies described herein. FIG. 12A illustrates the portion of a seismic recording array that would transmit seismic data to the data collection unit 120. The arrows represent the communication pathway under normal conditions. FIGS. 12B and 12C illustrate back up pathways should a gateway BDAC 220 become unavailable. In FIG. 12B, gateway $BDAC_{x+3}$ 220 fails to acknowledge that gateway $BDAC_{x+2}$ 220 has transmitted data. Therefore, gateway $BDAC_{x+2}$ 220 refers to its back up assignment table and transmits the data to gateway $BDAC_{x+4}$ 220 instead. Thus, the seismic recording array continues to function without gateway $BDAC_{x+3}$ 220. In FIG. 12C, gateway $BDAC_{x+2}$ 220 fails to acknowledge that $BDAC_x$ 200 and $BDAC_{x+1}$ 200 have transmitted data. Therefore, $BDAC_x$ 200 and $BDAC_{x+1}$ 200 refer to their back up assignment tables and proceed accordingly. $BDAC_{x+1}$ 200 becomes the new gateway BDAC 220 for the GDAC 300. Therefore, $BDAC_x$ 200 transmits its data to the new gateway $BDAC_{x+1}$ 220. The new gateway $BDAC_{x+1}$ 220 then transmits the data to gateway $BDAC_{x+3}$ 220. In this manner, the seismic recording array continues to record data without the use of gateway $BDAC_{x+2}$ 220.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for transmitting seismic data in a seismic field, comprising:
   transmitting a backup assignment table from a recorder system to a data acquisition cell, wherein the backup assignment table comprises one or more backup gateway data acquisition cells for the data acquisition cell;
   transmitting seismic data from the data acquisition cell to a first gateway data acquisition cell; and
   transmitting the seismic data from the data acquisition cell to a second gateway data acquisition cell in accordance with the backup assignment table if no acknowledge receipt of the seismic data is received by the data acquisition cell from the first gateway data acquisition cell, wherein the second gateway data acquisition cell is the first back UP gateway data acquisition cell for the data acquisition cell.

2. The method of claim 1, wherein the seismic data are transmitted through a wireless network.

3. The method of claim 1, wherein the data acquisition cell is deployed within about 200 meters of the first gateway data acquisition cell and the second gateway data acquisition cell.

4. The method of claim 1, further comprising transmitting the seismic data from the data acquisition cell by the first gateway data acquisition cell to a data collection unit.

5. The method of claim 1, further comprising transmitting the seismic data from the data acquisition cell by the first gateway data acquisition cell to a data collection unit through one or more gateway data acquisition cells.

6. The method of claim 1, further comprising transmitting seismic data acquired by the first gateway data acquisition cell along with the seismic data from the data acquisition cell to a data collection unit.

7. The method of claim 1, wherein the seismic data are transmitted from the data acquisition cell to the first gateway data acquisition cell through a first communication pathway and wherein the seismic data are transmitted from the data acquisition cell to the second gateway data acquisition cell through a second communication pathway, wherein the first communication pathway is different from the second communication pathway.

8. A seismic data acquisition cell deployable in a seismic field, comprising:
   a sensor;
   a processor; and
   a memory having stored therein program instructions executable by the processor to:
      receive a backup assignment table from a recorder system, wherein the backup assignment table comprises one or more backup gateway data acquisition cells for the data acquisition cell;
      transmit seismic data from the data acquisition cell to a primary gateway data acquisition cell; and
      transmit the seismic data from the data acquisition cell to the one or more backup gateway data acquisition cells if no acknowledge receipt of the seismic data is received by the data acquisition cell from the primary gateway data acquisition cell.

9. The seismic data acquisition cell of claim 8, wherein the seismic data acquisition cell is deployed within about 200 meters of the primary gateway data acquisition cell and the backup gateway data acquisition cells.

10. The seismic data acquisition cell of claim 8, wherein the seismic data are transmitted through a wireless network.

11. A seismic survey system, comprising:
   a data collection unit;
   an array of data acquisition cells in communication with the data collection unit through a wireless network, wherein at least one data acquisition cell comprises:
   a sensor
   a processor; and
   a memory having stored therein program instructions executable by the processor to:
      receive a backup assignment table from the data collection unit, wherein the backup assignment table comprises one or more backup gateway data acquisition cells and one or more backup communication pathways corresponding to the backup gateway data acquisition cells for the at least one data acquisition cell;
      transmit seismic data from the at least one data acquisition cell through a first communication pathway; and
      transmit the seismic data from the at least one data acquisition cell to a second communication pathway in accordance with the backup assignment table if no acknowledge receipt of the seismic data is received by the at least one data acquisition cell through the first communication pathway, wherein the first communication pathway is different from the second communication pathway.

12. The seismic survey system of claim 11, further comprising:
   a seismic source; and
   wherein the first communication pathway comprises a pathway to a first gateway data acquisition cell and the second communication pathway comprises a pathway to a second gateway data acquisition cell.

13. The seismic survey system of claim 12, wherein the first gateway data acquisition cell and the second gateway data acquisition cell are deployed within about 200 meters of the at least one data acquisition cell.

14. The method of claim 1, wherein the backup assignment table further comprises one or more backup gateway data acquisition cells for each gateway data acquisition cell.

15. The seismic data acquisition cell of claim 8, wherein the backup assignment table further comprises one or more backup gateway data acquisition cells for each gateway data acquisition cell.

16. The seismic survey system of claim 11, wherein the backup assignment table further comprises one or more backup gateway data acquisition cells for each gateway data acquisition cell.

* * * * *